3,335,204
PROCESS FOR PREPARING TRIALKYL
PHOSPHITES
Otto Scherer, Bad Soden, Taunus, and Peter Paul Rammelt, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Mar. 20, 1964, Ser. No. 353,570
7 Claims. (Cl. 260—976)

The present invention provides an improved process for preparing trialkyl phosphites.

It is known to prepare trialkyl phosphites by reacting phosphorus trihalides with aliphatic alcohols. The reaction takes place according to the following equation:

$$PCl_3 + 3CH_3OH \rightarrow P(OCH_3)_3 + 3HCl$$

(cf. Ullman volume 13 (1962), page 584; Kosolapoff, Organophosphorus Compounds (1950) pages 180 et seq.).

In the aforesaid reaction anhydrous alcohols and acid-binding agents must be used so that the halogen halide formed does not decompose the trialkyl phosphites with separation of alkyl groups. As acid-binding additives there have been proposed alkali metal alcoholates, primary and tertiary amines and ammonia.

The use of alkali metal alcoholates, primary and tertiary amines is expensive, complicated and disadvantageous owing to the known toxicity of the amines. When primary and tertiary amines are used they must be recovered in very complicated manner. The use of ammonia requires temperatures below —20° C. (cf. German Patents 937,-946 and 1,028,554, U.S. Patent 2,848,474).

It has now been found that trialkyl phosphites can be prepared from aliphatic alcohols with 1 to 9 carbon atoms and phosphorus trihalides, preferably phosphorus trichloride, in the presence of diluents by carrying out the reaction in the presence of ammoniated water-soluble salts of elements of Group II of the Periodic Table at a temperature in the range of about —5 to +10° C.

The process of the invention can be carried out, for example, in a manner such that an ammoniated water-soluble salt of an element of Group II of the Periodic Table is added to a mixture of an aliphatic alcohol and a diluent in such an amount that the proportion of ammonia contained in the said salt is at least 110% of the stoichiometric amount required for binding the hydrogen halide formed, and the mixture obtained is reacted with phosphorus trihalide.

Alternatively, to the mixture of the aliphatic alcohol and the diluent an ammoniated water-soluble salt of an element of Group II of the Periodic Table is added in a smaller amount, i.e., in an amount such that the proportion of ammonia contained in the said salt corresponds to at least 5% of the stoichiometric quantity required for binding the hydrogen halide formed, and during the reaction ammonia is introduced for the reformation of the ammoniated salt.

A further variant of the process of the invention consists in adding a water-soluble salt capable of being ammoniated of an element of Group II of the Periodic Table to the mixture of the aliphatic alcohol and the diluent in such an amount that, for example, 5 grams of salt are present for 100 grams of alcohol, transforming the salt by the introduction of ammonia wholly or partially into the ammoniated compound and then proceeding in the manner described above.

When operating in this manner ammonia is added until the pH value of the reaction mixture is above 7, preferably between 8 and 10, the pH value being measured by an electrometric pH measuring device.

After the reaction with phosphorus trihalide the reaction mixture is washed with water to remove dialkyl phosphites, ammoniated salt and ammonium halide formed as byproducts. The ammoniated salt acts as buffer in the wash water to a pH value above 7 so that a hydrolysis of the trialkyl phosphite does not occur. The organic phase obtained is dried, subjected to a fractional distillation and the trialkyl phosphite is obtained in a high yield.

As aliphatic alcohols there may be used primary and secondary, even water-containing, alcohols, for example methanol, ethanol, propanol-(1), propanol-(2), n-butanol-(1), n-butanol-(2), n-pentanol-(1), n-pentanol-(2), n-octanol-(1), 2-ethyl-hexanol-(1) either alone or in admixture with one another. Suitable phosphorus trihalides are preferably phosphorus trichloride and also phosphorus tribromide. The aliphatic alcohol is used in an amount of more than 2 mols, advantageously 3 to 4 mols, for 1 mol of phosphorus trihalide. It is likewise possible to use higher amounts of alcohol simultaneously serving as diluent.

As ammoniated compounds there are used the ammonia-addition compounds of water-soluble, dry or water-containing salts of the elements magnesium, calcium, strontium, barium, zinc and/or cadmium, capable, as is known, of adding 1 to 8 mols of ammonia. There are mentioned by way of example

| | |
|---|---|
| $MgCl_2 \cdot 6NH_3$ | $ZnCl_2 \cdot 4NH_3$ |
| $CaCl_2 \cdot 8NH_3$ | $ZnCl_2 \cdot 2NH_3$ |
| $CaCl_2 \cdot 4NH_3$ | $ZnBr_2 \cdot 4NH_3$ |
| $CaCl_2 \cdot 2NH_3$ | $ZnBr_2 \cdot 2NH_3$ |
| $CaBr_2 \cdot 6NH_3$ | $ZnSO_4 \cdot 5NH_3$ |
| $CaBr_2 \cdot 2NH_3$ | $ZnSO_4 \cdot 4NH_3$ |
| $Ca(NO_3)_2 \cdot 4NH_3$ | $Zn(NO_3)_2 \cdot 6NH_3$ |
| $Ca(NO_3)_2 \cdot NH_3$ | $Zn(NO_3)_2 \cdot 4NH_3$ |
| $SrCl_2 \cdot 8NH_3$ | $Zn(NO_3)_2 \cdot 3NH_3$ |
| $SrCl_2 \cdot NH_3$ | $CdCl_2 \cdot 4NH_3$ |
| $BaBr_2 \cdot 8NH_3$ | $CdSO_4 \cdot 4NH_3$ |
| $BaBr_2 \cdot 4NH_3$ | $Cd(NO_3)_2 \cdot 6NH_3$ |
| $BaBr_2 \cdot NH_3$ | $Cd(NO_3)_2 \cdot 4NH_3$ |
| $ZnCl_2 \cdot 6NH_3$ | |

In many cases the ammonia addition compounds of calcium chloride are preferred.

The amount of ammonia addition compound used is so high that during and after the reaction with phosphorus trihalide a pH value of at least 7 and advantageously 8 to 10 is maintained in the reaction mixture.

Suitable diluents in the process of the invention are, for example, ethers such as diethyl ether and di-isopropyl ether, halogenated alkanes such as methylene chloride, fluorotrichloromethane, difluoro-dichloromethane, ethyl chloride, trifluoro-trichloroethane, aliphatic or cycloaliphatic hydrocarbons such as petroleum ether, pentane, phenylcyclohexane and other diluents that are inert under the reaction conditions. It is likewise possible to use mixtures of the diluents specified above. The amount of diluent or alcohol in excess can vary within wide limits. In general, at least 100 milliliters are used for 1 mol of phosphorus trihalide.

The reaction temperature can be varied within certain limits, in general temperatures in the range of about —5° C. to +10° C. being preferred.

Owing to the buffering action of the ammoniated compound in the reaction mixtures the process allows of utilizing the hydrogen ion activity for a convenient control in an optimum narrow pH range which facilitates considerably the dosage when introducing ammonia and favorably influences the yield.

In a known process where only ammonia is used for binding the hydrogen halide the hydrogen ion activity is not buffered so that in this reaction system it is difficult exactly to maintain the desired pH range.

As far as the salts or ammoniated salts are capable of forming hydrates the trialkyl phosphites can be prepared by the process of the invention also with alcohols which are not completely free from water.

Trialkyl phosphites are valuable intermediate products, for example, for the synthesis of plant protective agents.

The following examples serve to illustrate the invention but they are not intended to limit it thereto.

*Example 1*

840 grams of ammoniated calcium chloride prepared from 522 grams of dry calcium chloride and 318 grams of dry ammonia were added to a mixture of 609 grams of methanol and 3500 grams of methylene chloride. 721 grams of phosphorus trichloride were dropped in at 0° C. over a period of 2 hours, with vigorous stirring. The reaction mixture was then washed with water, the aqueous phase was separated, the organic phase was dried and subjected to a fractional distillation. Trimethyl phosphite was obtained in a yield of 78% of the theoretical.

*Example 2*

110 grams of ammoniated calcium chloride prepared from 70 grams of dry calcium chloride and 40 grams of ammonia were added to a mixture of 609 grams of methanol and 1750 grams of petroleum ether. 721 grams of phosphorus trichloride were dropped in at 0° C. over a period of 2 hours, with vigorous stirring. The pH value of the reaction mixture was maintained between 9 and 10 by introducing dry ammonia and constantly controlled with a glass electrode. The reaction mixture was further processed as described in Example 1. Trimethyl phosphite was obtained in a yield of 80% of the theoretical.

*Example 3*

50 grams of dry, finely powdered calcium chloride were added to a mixture of 214 grams of absolute ethanol and 1400 grams of methylene chloride and the mixture was cooled to 0° C. Dry ammonia was then introduced until the pH value of the mixture, measured with the glass electrode, was 9 to 10. 206 grams of phosphorus trichloride were dropped in over a period of 2 hours while vigorously stirring and maintaining the pH value between 9 and 10 by introducing ammonia. The reaction mixture was further treated as described in Example 1. Triethyl phosphite was obtained in a yield of 82% of the theoretical.

*Example 4*

Dry ammonia was introduced at 0° C. into a mixture of 174 grams of methanol having a water content of 3%, 760 grams of di-isopropyl ether and 100 grams of fine dry calcium chloride until the pH value of the mixture measured with the glass electrode amounted to 9–10. A mixture of 206 grams of phosphorus trichloride and 206 grams of methylene chloride was dropped in over a period of 2 hours while vigorously stirring and introducing ammonia to maintain the pH value at 9–10. The reaction mixture was further processed as described in Example 1. Trimethyl phosphite was obtained in a yield of 75% of the theoretical.

*Example 5*

68 grams of zinc tetramine chloride were added to a mixture of 58 grams of methanol and 518 grams of methylene chloride. 68.7 grams of phosphorus trichloride were added dropwise at −5° C. over a period of 3 hours with vigorous stirring. Dry ammonia was simultaneously introduced to maintain the pH value of the reaction mixture between 8.5 and 9.5. The mixture was further processed as described in Example 1 and trimethyl phosphite was obtained in a yield of 76% of the theoretical.

*Example 6*

Dry ammonia was introduced at 0° C. into a mixture of 512 grams of methanol, 1750 grams of methylene chloride and 100 grams of fine dry calcium chloride until the pH value of the mixture was 9 to 10 measured with the glass electrode. 1420 grams of phosphorus tribromide were added over a period of 2 hours while vigorously stirring and introducing ammonia to maintain the pH value between 9 and 10. The reaction mixture was further treated as described in Example 1 and trimethyl phosphite was obtained in a yield of 80% of the theoretical.

*Example 7*

Dry ammonia was introduced at +10° C. into a mixture of 1185 grams of butanol, 3000 grams of methylene chloride and 150 grams of fine dry calcium chloride until the pH value of the mixture amounted to 9–10 measured with the glass electrode. 721 grams of phosphorus trichloride were added over a period of 2 hours while vigorously stirring and introducing ammonia to maintain the pH value between 9 and 10. The reaction mixture was then further treated as described in Example 1. Tributyl phosphite was obtained in a yield of 90% of the theoretical.

We claim:

1. Process for preparing trialkyl phosphites from aliphatic alcohols with 1 to 9 carbon atoms and phosphorus trihalide, selected from the group consisting of phosphorus trichloride and phosphorus tribromide, in the presence of a diluent which comprises carrying out the reaction in the presence of ammoniated water-soluble salts of elements of Group II of the Periodic Table at a temperature in the range of about −5° C. to +10° C. and isolating the trialkyl phosphites from the reaction mixture.

2. The process of claim 1 which comprises adding to the mixture of an aliphatic alcohol and a diluent the said ammoniated salt in an amount such that the ammonia contained therein is at least 110% of the stoichiometric amount required for binding the hydrogen halide formed.

3. The process of claim 1, which comprises adding to the mixture of aliphatic alcohol and diluent the said ammoniated salt in an amount corresponding to at least 5% of the stoichiometrically required amount of ammonia and introducing ammonia during the reaction with the phosphorus trihalide in the same measure as the ammoniated salt is consumed for the reformation of the said ammoniated salt.

4. The process of claim 1, which comprises adding to the mixture of aliphatic alcohol and diluent a water-soluble salt capable of forming an ammoniated compound of an element of Group II of the Periodic Table in an amount such that about 5% of the salt are present, calculated on the alcohol, and the ammoniated compound is formed in situ by introducing ammonia.

5. The process of claim 1, which comprises washing the reaction product for removing the secondary products formed, drying the organic phase and isolating the trialkyl phosphite by fractional distillation.

6. The process of claim 1, wherein ammoniated calcium chloride is used as ammoniated compound.

7. The process of claim 1, wherein phosphorus trichloride is used as phosphorus trihalide.

No references cited.

CHARLES B. PARKER, *Primary Examiner.*

A. SUTTO, *Assistant Examiner.*